(12) United States Patent  
Gandham et al.

(10) Patent No.: US 8,867,376 B1  
(45) Date of Patent: Oct. 21, 2014

(54) HOST VERIFICATION AT AN OPTICAL CIRCUIT SWITCH

(75) Inventors: Shashidar Rao Gandham, Fremont, CA (US); Amin Vahdat, Los Altos, CA (US); Yu Lin, Fremont, CA (US)

(73) Assignee: Google Inc., Mountain View, CA (US)

( * ) Notice: Subject to any disclaimer, the term of this patent is extended or adjusted under 35 U.S.C. 154(b) by 178 days.

(21) Appl. No.: 13/464,421

(22) Filed: May 4, 2012

(51) Int. Cl.  
*H04J 1/16* (2006.01)

(52) U.S. Cl.  
USPC ........................................ 370/250; 370/395.3

(58) Field of Classification Search  
USPC ........................................ 370/241, 250, 395.3  
See application file for complete search history.

(56) References Cited

U.S. PATENT DOCUMENTS

| | | | |
|---|---|---|---|
| 6,874,147 B1 * | 3/2005 | Diamant | 719/328 |
| 2006/0198634 A1 * | 9/2006 | Ofalt et al. | 398/16 |
| 2010/0250752 A1 * | 9/2010 | Ishihara et al. | 709/227 |
| 2011/0150475 A1 * | 6/2011 | Soto et al. | 398/63 |

* cited by examiner

*Primary Examiner* — Sai-Ming Chan  
(74) *Attorney, Agent, or Firm* — Foley & Lardner LLP; Edward A. Gordon (57) ABSTRACT

A system and method of verifying connectivity between hosts and optical ports in a data center is disclosed herein. The system and method includes directing, at a network control module (NCM), an electrical packet switch operatively connected to an optical port of the optical circuit switch, to transmit a data packet containing a MAC address of a host connected to an optical port determined by the NCM, and receiving, at the NCM, a response from the host, wherein the response comprises an indication that the MAC address contained in the transmitted data packet corresponds to the MAC address of a network interface card (NIC) at the host, and a determination of whether the host connected to the optical port determined by the NCM has been powered up.

22 Claims, 6 Drawing Sheets

HOST VERIFICATION AT AN OPTICAL CIRCUIT SWITCH

BACKGROUND

The underlying computer networks that support cloud computing can be divided into two major categories: intra-datacenter and inter-datacenter. Intra-datacenter networks interconnect the computing infrastructure (servers, disks) within the same building or among different buildings of a datacenter campus, while inter-datacenter network refers to connections from metropolitan to long-haul reach interconnecting multiple datacenters distributed at different geographic locations. Many modern high-speed data links use optical transmission technologies via optical fibers for both intra- and inter-datacenter networks.

Most of the actual computing and storage underlying the internet and cloud computing takes place in warehouse-scale data center buildings. Most of the long-haul links transferring data and requests back and forth between end users and data centers are switched through Internet points of presence (POP). Both environments must transfer a tremendous amount of data between individual computers and the switches responsible for getting the data to its destination. Data centers often contain predetermined topology structures for switching and interconnecting internet data to determine a given destination.

Data centers may implement optical circuit switches including several optical ports to interconnect electrical packet switches and hosts where the interconnections are not predetermined and may be altered depending on data traffic. In many cases, optical circuit switches (OCS) in such data centers must be initialized prior to being used in the data center. Initialization may include verifying connections between electrical packet switches and host servers (e.g. verifying proper cabling) and confirming OCS optical ports associations with particular hosts.

Typically, packet switches transmit a connectivity verification packet such as an address resolution protocol (ARP) request or an internet control message (ICMP) request. However, for such connectivity methods to work, each host in a sub-network, such as a data center, must be configured with a unique internet protocol (IP) address that is known in a central database, for example, as assigned by the dynamic host configuration protocol (DHCP). However, in the case of some dynamic OCS implementations used in emerging data centers, the wiring of each host to a respective OCS port must be verified prior to determining IP addresses for hosts in the sub-network.

SUMMARY OF THE DISCLOSED IMPLEMENTATIONS

One implementation described herein relates to a method of verifying connectivity between a host and optical ports on an optical circuit switch in a data center based on a host media access control (MAC) address. The method includes directing, at a network control module (NCM), an electrical packet switch operatively connected to an optical port of the optical circuit switch, to transmit a data packet containing a MAC address of a host connected to an optical port determined by the NCM, receiving, at an electrical packet switch, a response from a host that is operatively connected to the optical port determined by the NCM, that the MAC address contained in the transmitted data packet corresponds to the MAC address of a network interface card (NIC) at the host connected to the optical port determined by the NCM, and receiving, at the NCM, the response from the host, wherein the response comprises a determination of whether the host connected to the optical port determined by the NCM has been powered up.

Another implementation described herein relates to a method of verifying connectivity between a host and optical ports on an optical circuit switch in a data center based on a host MAC address. The method includes transmitting, to a host operatively connected to the OCS, a data packet from an electrical packet switch that is operatively connected to an optical port of the optical circuit switch, receiving, at an electrical packet switch, a response from the host including a data packet containing the MAC address and OCS port of the host in response to the host initiating a wake up procedure, transmitting, to the NCM, a data packet including the MAC address of the host and the OCS port the host is connected to, from the electrical packet switch, and storing the MAC address and associated OCS ports in memory at the NCM.

Another implementation described herein relates to a method of verifying connectivity between a host and optical ports on an optical circuit switch in a data center based on a host MAC address. The method includes determining, if MAC addresses associated with hosts operatively coupled to an OCS are stored in memory, executing a first process, using a processing circuit, if MAC addresses are stored in memory, and executing a second process, using a processing circuit, if the MAC addresses are not stored in memory. The first process includes transmitting a data packet containing a MAC address from an electrical packet switch, receiving the data packet containing a MAC address at a network interface card (NIC) of a host, powering up the host in the case that the MAC address in the data packet corresponds to the MAC address of the NIC, receiving an indication that the host is powered up, and transmitting, to a network control module, the indication the host is powered up. The second process includes transmitting a data packet from an electrical packet switch that is operatively connected an optical port of the optical circuit switch, receiving the data packet at a NIC of a host operatively connected to an optical port of the optical circuit switch, automatically initiating a wake up procedure at the host in response to receiving the data packet, and transmitting a data packet including the MAC address of the host to the electrical packet switch in response to receiving the data packet.

Yet another implementation described herein relates to a system for verifying connectivity between a host and optical ports on an optical circuit switch in a data center based on a host MAC address. The system includes optical ports on the optical circuit switch system operably connected to a plurality of hosts, optical ports on the optical circuit switch system operably connected to a plurality of electrical packet switches, a network control module that includes a memory and at least one processor to execute network control software stored in the at least one memory to determine an optical linking topology for the optical circuit switch (OCS) wherein the optical linking topology includes connections between OCS ports connected to electrical packet switches and hosts using a processing circuit, and instruct the plurality of electrical packet switches to transmit a WOL data packet containing a MAC address from the electrical packet switch to a host connected to an optical OCS port. The system also includes a network interface card (NIC) at a host configured to power up the host in the case that the MAC address in the WOL data packet corresponds to the MAC address of the NIC, wherein the plurality of electrical packet switches receive an indication that the host is powered up and transmit, to a network control module, the indication the host is powered up.

BRIEF DESCRIPTION OF THE DRAWINGS

Illustrative implementations are hereinafter described, wherein like reference numerals refer to like elements, in which.

DETAILED DESCRIPTION OF THE ILLUSTRATIVE IMPLEMENTATIONS

Before describing in detail the particular improved system and method, it should be observed that the several disclosed implementations include, but are not limited to, a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the disclosed implementations are not limited to the particular implementations depicted in the example diagrams, but should be construed in accordance with the language in the claims.

Some implementations described herein provide dynamic bandwidth and topology requests from applications running on servers and from network operators which are not limited by a manual or static structure. Some implementations described herein provide more efficient switching and routing at a data center. Some implementations described herein provide active fault detection troubleshooting and the capability to automatically protect against failures. Some implementations described herein provide an optical switching system with less need for local on-site access and manual rewiring to expand bandwidth capacity or to recover from connection failures. Furthermore, implementations of dynamic data centers disclosed herein do not manage traffic according to predetermined topologies, but rather manage traffic according to dynamic optical network topologies. Data centers that include optical network topologies do not have a predetermined physical wiring configuration to report to a central server during initialization. Accordingly, known processes that assign and confirm the physical location of an IP address is not applicable for verifying host wiring during initialization of data centers that implement dynamic networking. According to one implementation, the physical wiring of a host to optical ports can be verified by without requiring an IP address using the systems and/or methods disclosed herein.

Figure 1:
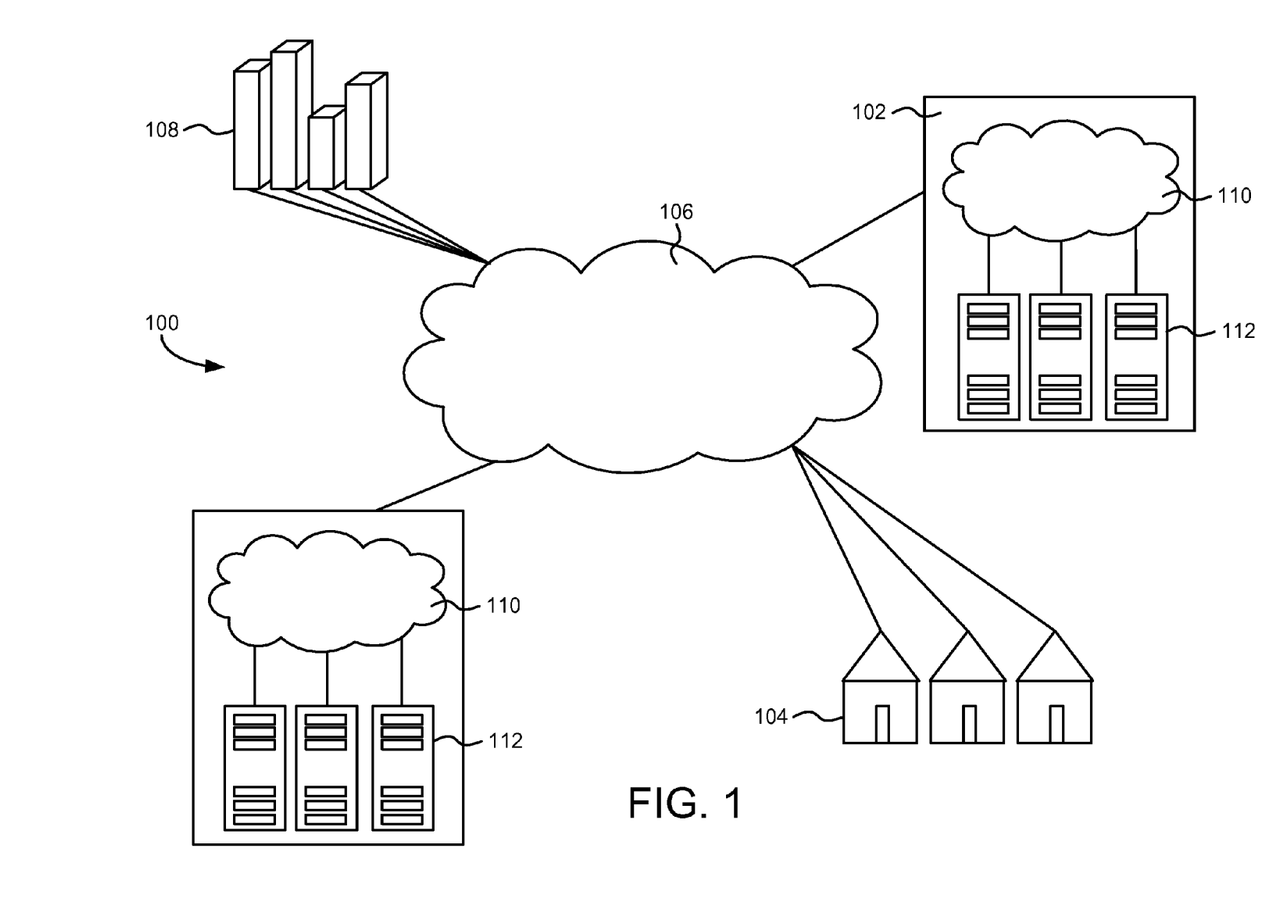
FIG. 1 is an overall system diagram depicting the use of data centers in an internet network according to one illustrative implementation.

Referring to FIG. 1, a general system diagram of an internet network 100 connecting data centers 102, area networks 108 used by individual businesses or various geographic localities (including wide-area networks (WAN) or local area networks (LAN)) and individual users 104. Individual users 104 or area network users 108 may use computing, storage and networking infrastructure included in data centers 102. For example, data centers 102 may support client-server interaction, data security, cloud computing services, data storage, data access, data computation, and software access, for example. In general, data centers 102 may include a large number of interconnected servers and other computing devices according to one illustrative implementation. In addition to being deployed in a data center 102, data storage and data routing may also be deployed in other fiber rich facilities such as high-degree backbone points of presence (POP) or in other networks. The servers and other computing devices may be connected through various switching and routing devices at data center 102 according to one implementation. Furthermore, switching and routing devices in each data center 102 may be controlled by a control network prior to transmitting and receiving data from individual users 104, other data centers 102, or WAN's/LAN's 108.

Additionally, Internet data and data control information is exchanged between end users 104, 108 and data centers 102 using various switches at data centers 102. The switches within data centers 102 are used to read address information for example, to transmit data to an intermediate or final destination. Accordingly, data centers 102 must transfer a high volume of data between individual computers and switches.

Figure 2:
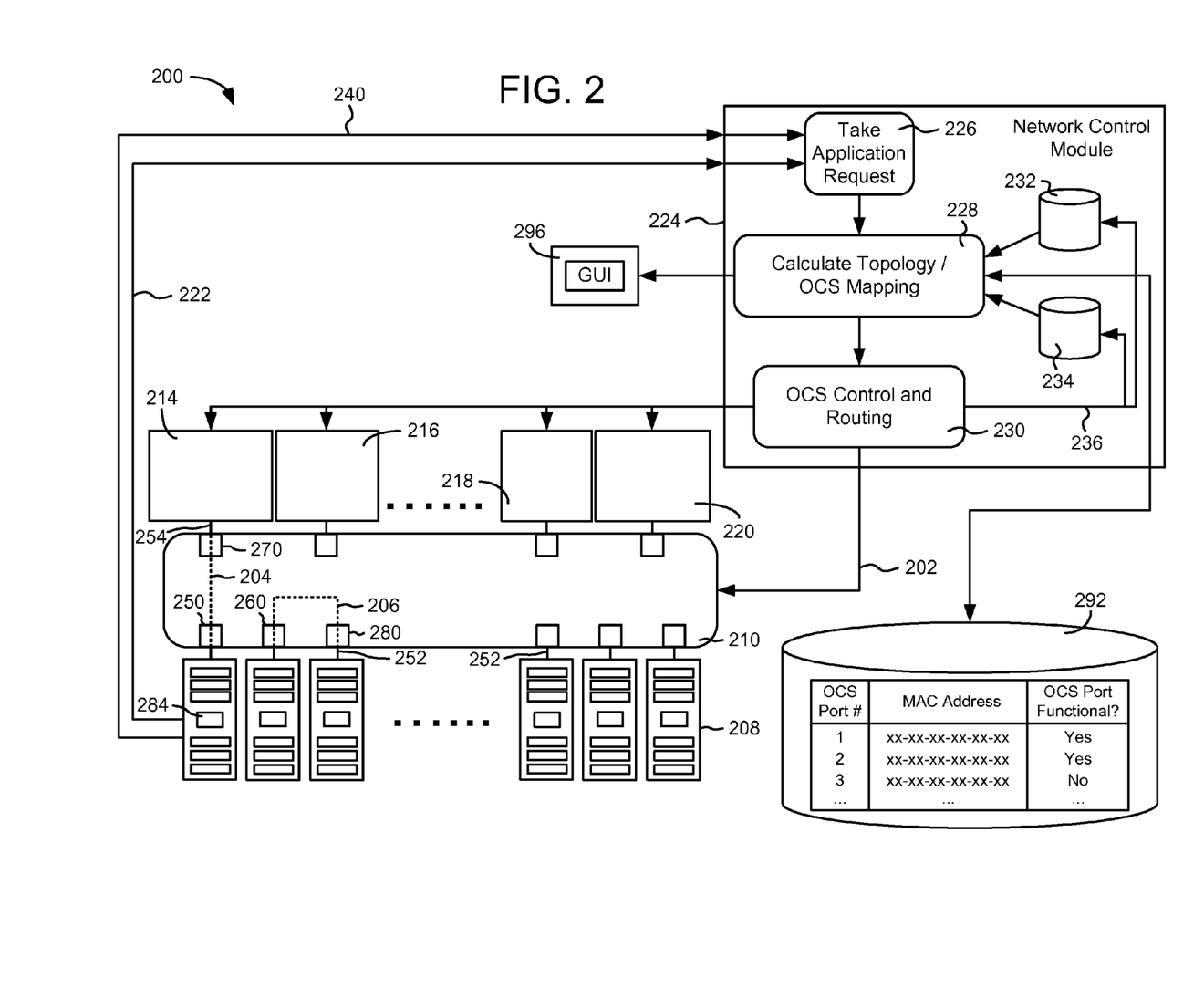
FIG. 2 is a schematic diagram of a network architecture in a data center according to one illustrative implementation.
Figure 5:
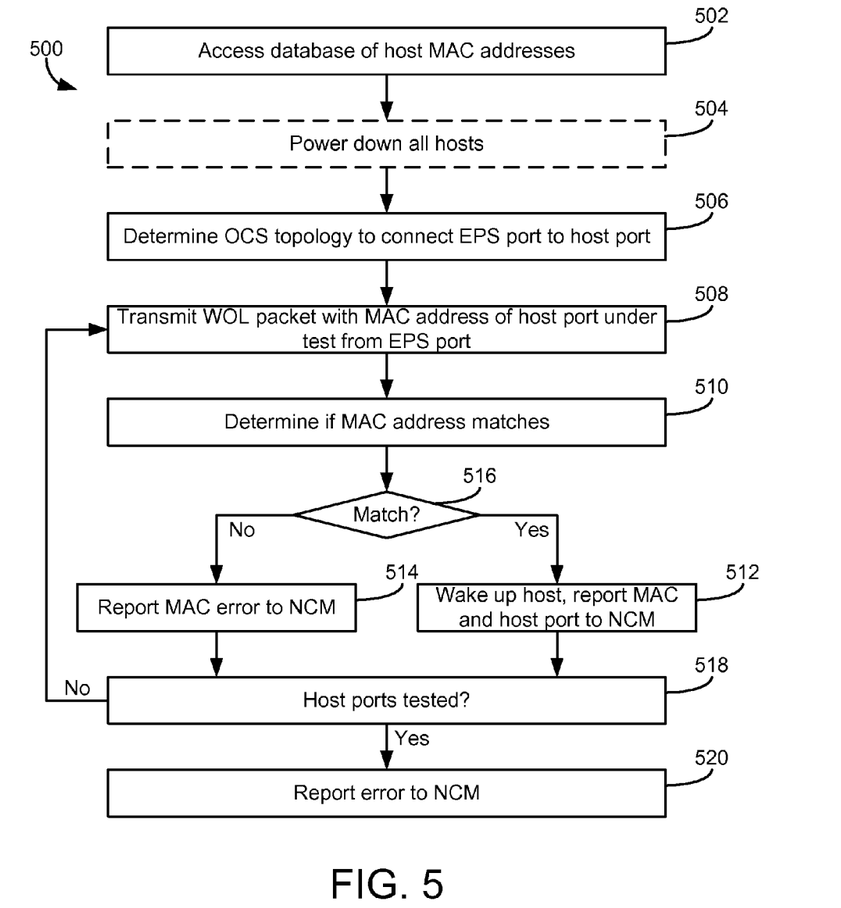
FIG. 5 is a flow chart depicting a process determined by network control software that can be used in an optical circuit switched network according to one illustrative implementation.
Figure 6:
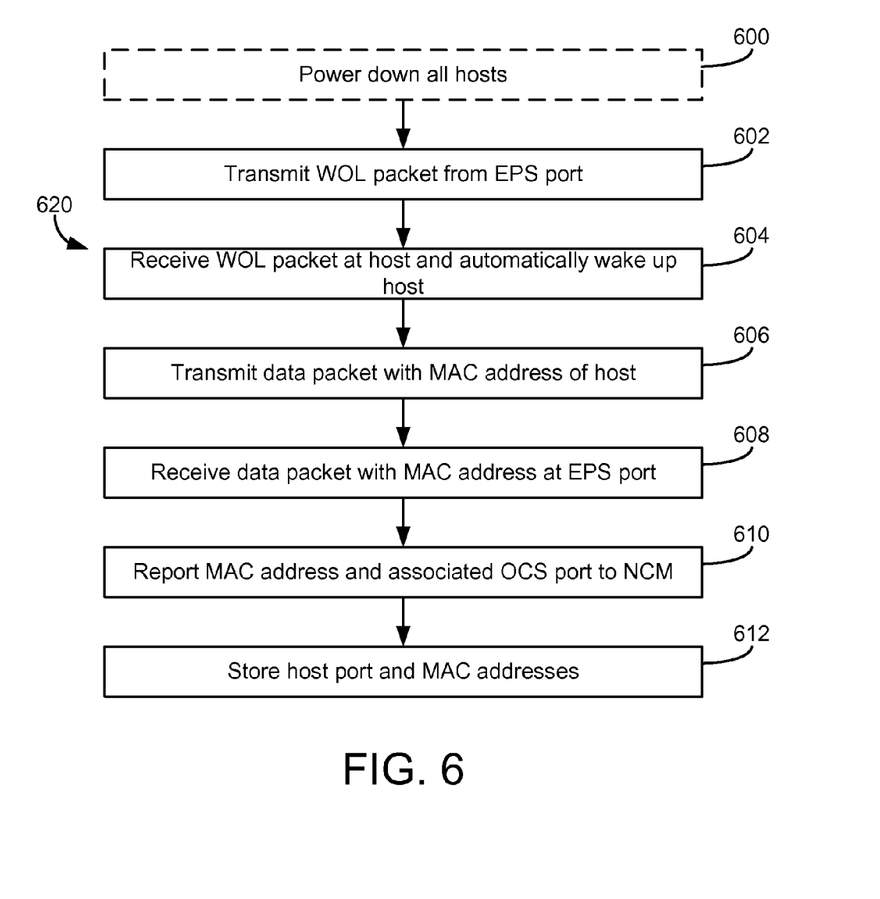
FIG. 6 is a flow chart depicting a process determined by network control software that can be used in an optical circuit switched network according to another illustrative implementation.

Although some data centers manage traffic according to predetermined topologies, where network topologies are built in a manual and static fashion, network 200, as shown in FIG. 2, manages traffic that is not predetermined. Network 200 implements dynamic optical network topologies through OCS 210 between electrical packet switches 214, 216, 218, 220 and hosts 208. In this way, network 200 does not have a predetermined physical wiring configuration to report to a central server during initialization of the OCS 210. Accordingly, processes such as DHCP that assign and confirm the physical location of an IP address are not applicable for verifying host wiring during initialization of data center 200 in many cases. According to one implementation, the physical wiring of a host to optical ports 250, 260, 270 and 280 on an OCS 210 can be verified by without requiring an IP address assignment for hosts connected to an OCS 210. Host wiring can be verified using processes 500 and 620 as shown in FIG. 5, FIG. 6, and FIG. 7 respectively, according to several implementations.

Referring again to FIG. 2, OCS 210 may provide dynamic host to host, electrical packet switch (EPS) to host, host to EPS, EPS to EPS, or OCS to OCS data connectivity, for example. OCS 210 may alter optical link connections 204, 206 between OCS ports 250 and 270 and optical ports 260 and 280, for example, using micro-electromechanical systems (MEMS), for example. The dynamic optical link topology may be determined by a topology software module 228, according to one implementation. According to one illustrative implementation, OCS 210 uses a crossbar of electrically controlled mirrors to direct a beam of light from any input port to any output port. For example, network control module 224 may direct the MEMS in OCS 210 to transmit optical link 204 from OCS port 260 to OCS port 250, for example. The MEMS mirrors may be attached to miniature motors which are controlled by OCS control and OCS control and routing module 230, for example. OCS control and routing module 230 may store MEMS control data at each optical port 250, 260, 270 and 280 as well as electrical packet switch instructions for routing data to servers 208. Control data for the OCS 210 may be transmitted on data link 202, while control data for the electrical packet switches may be transmitted on a data link as shown in FIG. 2, according to one implementation.

The optical link topology may be determined by a topology software module 228. Topology module 228 may monitor real time communication patterns, estimate network traffic, and calculate new topologies or OCS configurations based on traffic data and traffic calculations. The results of determinations made at topology module 228 may be translated into circuit switch commands at OCS control and routing module 230. These circuit switch commands may then be communicated to OCS 210 and electrical packet switches 214, 216, 218, and 220, which can be Ethernet switches. Furthermore, although shown as a distinct entity in FIG. 2, network control module (NCM) 224 may be embedded in OCS 210 or may be coupled to several different OCS patch panels to provide circuit switching commands. Additionally, NCM 224 may reside on one or multiple servers according to some additional implementations. According to one implementation, OCS 210 is non-blocking such that data connections may be established between any OCS connected device, such as electrical packet switches 214, 216, 218, and 220 or hosts 208. In such non-blocking implementations, NCM 224 is able to calculate, establish and alter optical link topologies between any two OCS connected devices. Accordingly, non-blocking implementations provide increased bandwidth allocation efficiency and optical link failure correction over communication systems that rely on predetermined and static data link topologies, as predetermined topologies have limited host to switch, switch to switch, and host to host connectivity.

Before data center network 200 is fully operational within an internet network 100, component parts of the data center network may be assembled by connecting electrical switches 214, 216, 218, and 220 as well as hosts or servers 208 to OCS 210. According some implementations, hosts, servers or other computing devices 208 are connected to optical ports 250, 260, 270, 280, etc. at OCS 210 by fiber optic cables 254 and 252. The fiber optic cables may include a single optical fiber carrying bidirectional optical communication links or multiple optical fibers each carrying unidirectional transmit or receive optical communication links. Each optical port 250, 260, 270, 280, etc. may be identified by a port number such as 1-20, for example, such that each host 208 is associated with a particular optical port.

Figure 4:
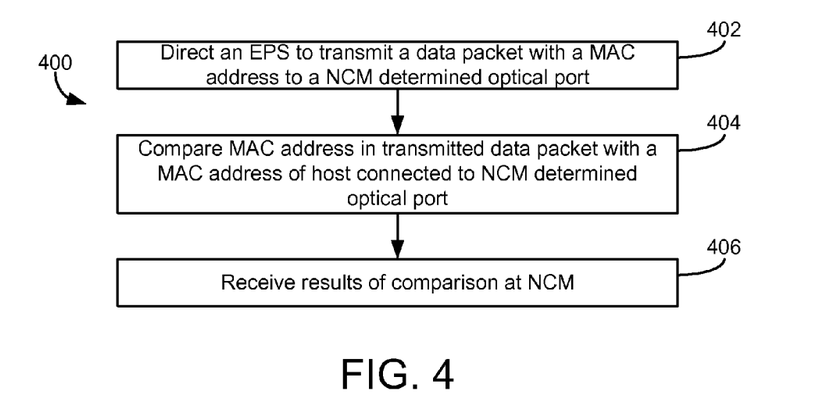
FIG. 4 is a general flow chart depicting a process determined by network control software that can be used in an optical circuit switched network according to one illustrative implementation.

Prior to becoming functional as a part of network 100, data center network 200 must store host configuration data at network control module 224. The host configuration data includes which ports of OCS 210 are connected to which hosts 208, and whether the connection is operating properly. This host configuration data may be stored in a device configuration database 292, which may provide media access control (MAC) address information associated with OCS ports 250, 260, 260, and 280, according to one illustrative implementation. The general host wiring verification process 400 involving communication between NCM 224, EPS 214, 216, 218, 220, and hosts 208, according to one implementation is shown in FIG. 4. Generally, NCM 224 will direct one or more of EPS 214, 216, 218, 220 to transmit a data packet including a host identifier, such as a MAC address to an optical port such as one of OCS ports 250, 260, 260, and 280, for example at step 402. Next, at step 404, the host 208 compares the host identifier received from the EPS with its own host identification data. In addition, at step 406, the results of the comparison, for example a match of identifiers or no match of identifiers is received back at NCM 224 and stored in a database, such as database 292.

Device configuration database 292 may also include indications of whether an electrical packet switch was able reach the host. According to one implementation, configuration database 292 is populated according to processes 500 and/or 620, according to some illustrative implementations. Once data center network 200 is initialized, configuration database 292 can be used to provide host and port data to topology module 228, generate reports on non-functional links, or provide display data to graphical user interface 296 to display the results of processes 500 and 620 to a network administrator.

According to one illustrative implementation, network control module (NCM) 224 determines whether to execute instructions stored in memory associated with either process 500 or process 620 depending on whether MAC addresses are already stored in the configuration database. For example, if NCM 224 determines that MAC addresses have already been stored in configuration database 292, NCM 224 may initiate process 500, which is used to confirm the MAC addresses already stored in database 292 according to one illustrative implementation. These addresses may have been manually entered at GUI 296 or may have been determined according to an initial computing device discovery procedure, for example.

According to one implementation NCM 292 uses the OCS port number and the MAC address of the host associated with the OCS port number to populate the "OCS port functional" portion of database 292 using process 500. In some cases the MAC addresses and OCS port associations initially entered into database 292 do not accurately reflect the actual physical wiring of hosts 208 to OCS 210. This may be due to an operator wiring a host to the wrong OCS port, a fiber link 252 malfunction, or an OCS optical link malfunction according to various illustrative implementations. In cases where process 500 determines that the OCS port is unable to connect to the MAC address associated with it in database 292, process 500 indicates the OCS port as non-functional, as shown with OCS port number 3. In addition, a report of all faulty OCS ports may be provided to a network administrator through GUI 296, a paper print out, or various other data file implementations so that the host wiring error may be corrected manually.

Furthermore, if NCM 224 determines that MAC addresses have not been stored in configuration database 292, NCM 224 may initiate process 620, which is used to populate configuration database with MAC addresses of computing devices such as hosts 208 physically wired to the various OCS ports 250, 260, 260, and 280. According to one illustrative implementation, once process 620 is used to populate database 292 with OCS port and MAC address associations, process 500 may subsequently be used to confirm the wiring of hosts 208 to the OCS 210.

Referring now to FIG. 5, a first process 500 for verifying host 208 wiring to an optical circuit switch 210 is shown. According to one implementation, process 500 accesses configuration database 292 to retrieve MAC address and OCS port data at step 502. Once this MAC address and OCS port pairing data is retrieved, it may be communicated to electrical packet switches (EPS) such as Ethernet packet switches 214, 216, 218, and 220 via a data link as shown in FIG. 2. Optional step 504 may take place before or after MAC address/OCS port pairings have been communicated to the EPS. At step 504, NCM 224 may direct EPS 214, 216, 218, and 220 to broadcast a data packet to the network interface cards 284 at each of the host devices 208 directing the hosts to enter a sleep or hibernation mode. Alternatively, a network administrator may manually shut down all host devices 208 operatively connected to OCS 210 prior to process 500 and/or 620.

Once it is determined that hosts 208 connected to OCS 210 are powered down at step 504, process 500 may determine an optical link topology for transmitting data packers from EPS to hosts 208. According to one implementation, step 506 may ensure that an optical link to every host connected to OCS 210 is tested. For example, step 506 may determine that EPS 214 will first transmit a data packet to host 208 connected to OCS port 250 and that EPS 214 next transmit a data packet to host 208 connected to OCS port 260, etc. until all hosts and/or optical ports have been tested. According to another illustrative implementation, step 506 determines an optical link topology such that all possible optical link combinations between an EPS and a host connected to OCS 210 is tested in a particular order. Furthermore, step 506 may determine an optical link topology at step 506 at topology module 228 such that EPS 214, 216, 218, and 220 transmit data packets to hosts 208 at various OCS ports substantially simultaneously. In addition, step 506 may determine that data packets should be broadcast to all OCS ports from one or more EPS connected to OCS 210.

Once the optical communication topology has been determined at step 506, the topology is communicated to EPS 214, 216, 218, and 220 via a data link as shown in FIG. 2. Once one or more EPS 214, 216, 218, and 220 has received the optical topology data, EPS 214, 216, 218, and 220 transmit wake on local area network (WOL) data packets at step 508. One illustrative implementation of a WOL data packet is shown as element 302 in FIG. 3. At step 508, a WOL data packet will be transmitted from one or more EPS 214, 216, 218, and 220 according to the optical link topology determined at step 506. In this case, each of the WOL data packets such as WOL packet 302 includes a specially formed message unique to each host 208 connected to OCS 210. Each computer's NIC 284 is uniquely identifiable by its MAC address. MAC addresses are most often assigned by the manufacturer of the NIC and are stored in its hardware, the card's read-only memory, or some other firmware mechanism. MAC addresses follow a 48 bit addressing scheme represented by 6 bytes in Hexadecimal format, represented by elements 304 and 306 in standard Ethernet frame 300, for example. According to one implementation, the WOL data packet makeup is similar to a standard Ethernet frame 300 including a preamble or start frame to synchronize between sending and receiving devices such as an EPS and host, for example. Next, the Ethernet frame includes a destination address 304 and a source address 306. For example, in process 500, the WOL packet would include the MAC address of the EPS transmitting at step 508 and the MAC address of the receiving host at step 506 according to one illustrative implementation. In addition, Ethernet frame 300 also includes a frame section devoted to the exact length of the frame's data field, this is used later as part of the cyclic redundancy check (CRC) frame section to ensure that the message was received properly. Frame 300 also includes a data section or field including the payload of the data packet and a cyclic redundancy check (CRC) section to look for errors. If the calculations match, no error occurred. Calculations that do not match are an indication that the data has changed and the frame is dropped.

Figure 3:
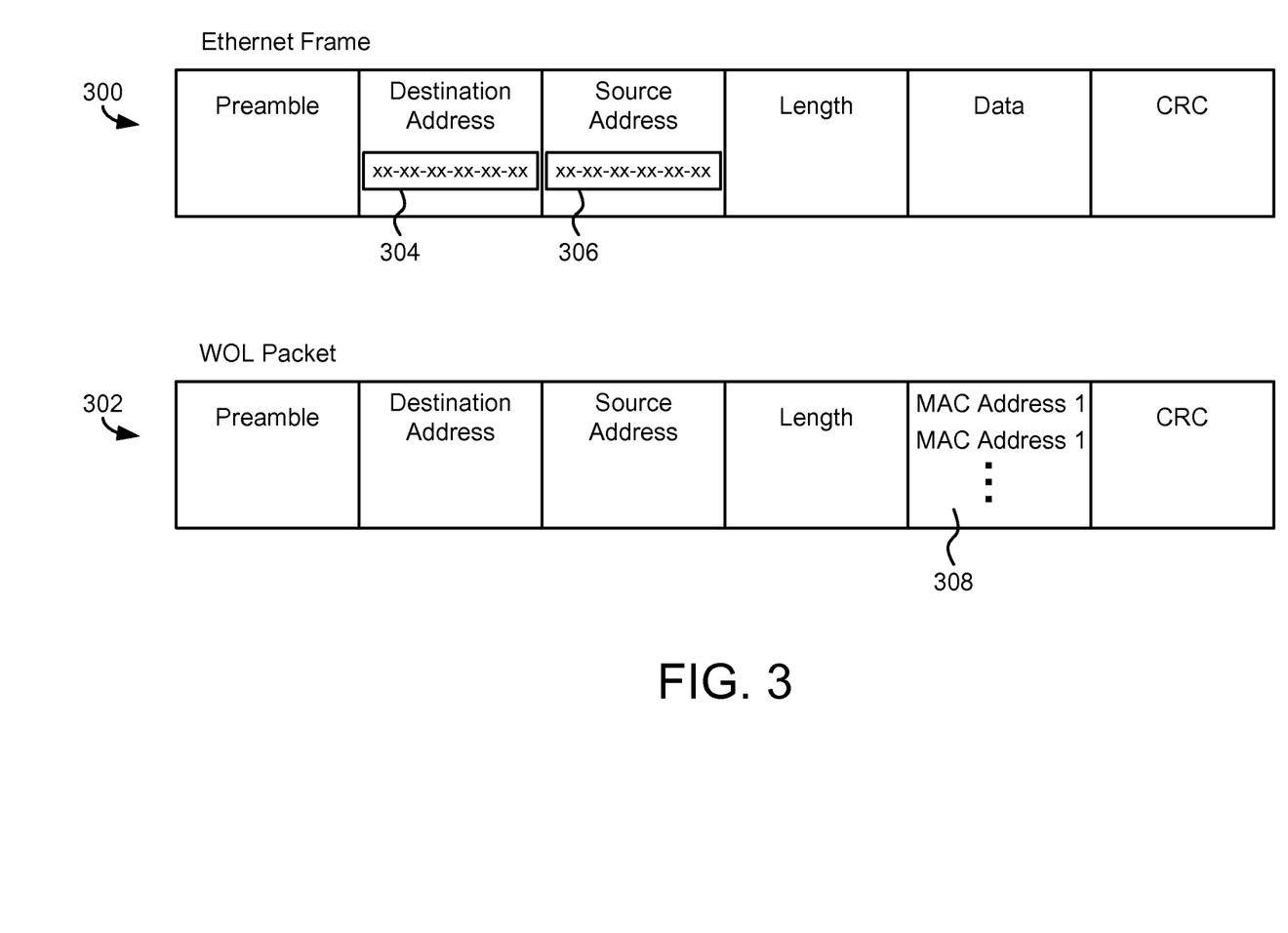
FIG. 3 is a block diagram of data packets according to one illustrative implementation.

Referring again to the exemplary WOL packet 302 transmitted at step 508, the WOL packet differs from Ethernet frame 300 in that the data payload 308 includes the MAC address of the host port receiving the WOL packet 302 at step 510. According to one implementation, the MAC address is repeated several times, such as 16 times for example, in WOL packet payload section 308. Once the WOL packet 302 is received at the host 208 determined at step 506, the NIC at the host 208 that receives the WOL packet 302 reads the MAC address, such as "MAC address 1" in the payload of the WOL packet 302 and compares it with its unique MAC address at step 516. In the case that the MAC address is repeated a predetermined number of times, the NIC card will determine if the MAC address is repeated the predetermined number of times. If MAC address 1 matches the MAC address assigned by the manufacturer of the receiving NIC, then the NIC initiates a power up or wake up procedure as step 512 so that the receiving host 208 can send an acknowledgement data packet, such as an Ethernet frame back to the transmitting EPS confirming that the configuration stored in configuration database 292 is correct. This Ethernet frame may be transmitted from host 208 to the transmitting EPS determined at step 506. Furthermore, the transmitting EPS may report the confirmation back to NCM 224 so that the NCM 224 can store confirmation in database 292 in the "OCS Port Functional" column, for example at step 512.

Furthermore, if no MAC address match is detected at step 516, the NIC 284 located at host 208 will not wake up or power up host 208 in response to the comparison step 516. In this case, EPS port 214, for example will report to NCM 224 that the optical link connection for one of the OCS port/MAC address combinations, such as for OCS port 3, stored in configuration database 292 is not functional at step 514. In response to this report, NCM 224 may store data in configuration database 292 indicating the OCS port associated with the MAC address in database 292 is incorrect, as shown with OCS port 3 in FIG. 2. After this step, process 500 determines if all hosts have been verified for correct wiring at step 518. If there are hosts that have not been verified, process 500 returns to step 508 to verify the wiring of the remaining hosts according to one implementation. Otherwise, process 500 is complete and a report of the wiring verification results may be generated at step 520. According to one implementation, a network administrator can access the completed configuration database 292 using GUI 296.

As stated previously, NCM 224 determines whether to execute instructions stored in memory associated with either process 500 or process 620 depending on whether MAC addresses are already stored in configuration database. According to one implementation, if configuration database 292 does not contain MAC addresses associated with various OCS optical ports, NCM 224 initiates process 620 as shown in FIG. 6.

Referring to FIG. 6, a process 620 for determining and storing an association between OCS ports such as OCS ports 250, 260, 270, and 280 and hosts 208 associated with a unique MAC address is shown in FIG. 6. Furthermore, an initial step of ensuring hosts are powered down may be taken at step 600. According to one implementation, step 600 ensures hosts 208 connected to OCS 210 are powered down by directing EPS 214, 216, 218, and 220 to broadcast a data packet to the network interface cards 284 at each of the host devices 208 directing the hosts to enter a sleep or hibernation mode. Alternatively, a network administrator may manually shut down all host devices 208 operatively connected to OCS 210 at step 600.

According to one implementation, once it is determined that hosts 208 connected to OCS 210 are powered down, process 620 may determine an optical link topology for transmitting data packers from EPS to hosts 208. Alternatively, process 620 may be initiated by having one or more EPS 214, 216, 218, and 220 broadcast data packets such as WOL packet 302, for example, to all ports associated with a host 208 at step 602. These WOL packets will include the source address 306 of the EPS that transmits the data packet at step 602. However, because the NCM 224 does not have configuration database 292 populated with MAC addresses, the transmitting EPS will not be able to enter a MAC address in the destination address field 304. Furthermore, because the NIC does not receive a MAC address to perform a MAC address comparison, the WOL packet will include instructions in data field 308 to automatically perform a power up or wake up procedure. Accordingly, at step 604, the NIC 284 of any host 208 receiving a WOL packet wakes up host 208 without performing a MAC address comparison as performed in process 500. At step 606, all hosts that have been powered up or woken up at step 604 transmit a data packet, such as an Ethernet frame including the MAC address of the host 208 to the source address of the EPS that originally transmitted at step 602. Accordingly, data packets such as Ethernet frames transmitted from hosts at step 606 will include the MAC address of the host in field 306, or source address and the MAC address of the EPS that originally transmitted in field 304, or destination address.

Once the data packet is received at the destination EPS at step 608, the EPS can determine the MAC address of the host as well as the OCS port on OCS 210 that the host 208 transmitted from based on data contained in the received Ethernet frame. Furthermore, the EPS may report the received OCS port/MAC address pairing to NCM 224 at step 610 so that the NCM 224 can store the received OCS port/MAC address pairing in database 292 in the OCS port number and MAC address columns, for example at step 612. Furthermore, once step 612 is complete and configuration database 292 has been populated with OCS port/MAC address pairings, NCM 224 may subsequently initiate process 500 to confirm the wiring of the OCS port/MAC address pairings to determine if any wiring errors have occurred since the execution of process 620.

Referring again to FIG. 1 and FIG. 2, servers or hosts 112 and 208 are typically computing devices having a processor, a memory and an NIC 284. The processing circuit may comprise digital and/or analog electrical components (e.g., a microprocessor, application-specific integrated circuit, microcontroller, or other digital logic) configured to perform the functions described herein. The processing circuit may be a single server computer or a plurality of server computers, and may operate in a cloud computing environment, such as a shared, scalable computing environment. The memory includes storage media, which may be volatile or non-volatile memory that includes, for example, read only memory (ROM), random access memory (RAM), magnetic disk storage media, optical storage media, flash memory devices and zip drives. Memory may store data files associated with particular websites in a database format. Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus, such as a processing circuit. A processing circuit such as CPU may comprise any digital and/or analog circuit components configured to perform the functions described herein, such as a microprocessor, microcontroller, application-specific integrated circuit, programmable logic, etc. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of verifying connectivity between hosts and optical ports on an optical circuit switch (OCS) in a data center based on the hosts' media access control (MAC) address, comprising:
   directing, at a network control module (NCM), an electrical packet switch operatively connected to an optical port of the optical circuit switch, to transmit a data packet containing a MAC address of a host connected to an optical port determined by the NCM;
   receiving, at the NCM, a response from the host, wherein the response comprises an indication that the MAC address contained in the transmitted data packet corresponds to the MAC address of a network interface card (NIC) at the host;
   storing the indication that the MAC address contained in the transmitted data packet corresponds to the MAC address of the NIC in memory at the NCM; and
   compiling and storing a list of optical ports on the OCS that are associated with a non-functional optical link and generating display data including the list of optical ports associated with a non-functional optical link based on the stored determination,
   wherein the OCS is a non-blocking OCS such that the NCM may direct any optical port on the optical circuit switch to connect with any other optical port on the OCS.

2. The method of claim 1, further comprising determining an optical linking topology for the OCS, using a processing circuit, wherein the optical linking topology comprises connections between OCS ports connected to electrical packet switches and hosts, prior to transmitting a data packet containing a MAC address from the electrical packet switch.

3. The method of claim 2, wherein the optical linking topology is determined at the NCM and the NCM is operatively connected to at least one of the OCS and the electrical packet switch.

4. The method of claim 1, wherein the electrical packet switch is an Ethernet packet switch.

5. The method of claim 1, wherein the data packet containing a MAC address is a wake on LAN (WOL) data packet.

6. The method of claim 1, wherein the data packet containing a MAC address transmitted to the host is transmitted to the host determined by the optical linking topology.

7. The method of claim 1, wherein the MAC address of the host and the optical port connected with the host are stored in memory at the NCM prior to transmitting a data packet containing a MAC address from the electrical packet switch.

8. The method of claim 1, wherein the host and the electrical packet switch are connected to the OCS by an optical fiber link.

9. The method of claim 1, further comprising powering down all hosts that are operatively connected to the OCS prior to transmitting the data packet from the electrical packet switch, wherein the hosts are powered down by at least one of manually powering down and broadcasting a power down instruction from the NCM.

10. The method of claim 1, wherein the indication comprises a determination of whether the host connected to the optical port determined by the NCM has been powered up.

11. A method of verifying connectivity between hosts and optical ports on an optical circuit switch (OCS) in a data center based on the hosts' MAC address, comprising:
    directing, at a network control module (NCM), an electrical packet switch operatively connected to an optical port of the optical circuit switch, to transmit to the host operatively connected to the OCS, a data packet;
    receiving, at the NCM, a response from the host including a data packet containing the MAC address and OCS port of the host in response to the host initiating a wake up procedure, wherein the data packet includes the MAC address of the host and the OCS port the host is connected to, from the electrical packet switch; and
    storing the MAC address and associated OCS ports in memory at the NCM;
    wherein the OCS is a non-blocking OCS such that the NCM may direct any optical port on the optical circuit switch to connect with any other optical port on the OCS.

12. The method of claim 11, wherein the NCM does not have access to MAC addresses for each host operatively connected to the OCS stored in memory prior to transmitting the data packet from the electrical packet switch.

13. The method of claim 11, further comprising determining, using a processor circuit, an optical linking topology for an optical circuit switch (OCS) based on the stored MAC addresses and associated OCS ports stored in memory, wherein the optical linking topology comprises a connection between an OCS port associated with an electrical packet switch and a host.

14. The method of claim 11, wherein the electrical packet switch is an Ethernet packet switch and the data packet including the MAC address is an Ethernet frame.

15. The method of claim 11, wherein the data packet transmitted from the Ethernet packet switch is a WOL data packet.

16. The method of claim 11, wherein the host and the electrical packet switch are connected to the OCS by an optical fiber link.

17. The method of claim 11, further comprising powering down all hosts that are operatively connected to the OCS prior to transmitting the data packet from the electrical packet switch, wherein the hosts are powered down by at least one of manually powering down all hosts that are operatively connected to the OCS and broadcasting a power down instruction from the NCM.

18. A method of verifying connectivity between hosts and optical ports on an optical circuit switch (OCS) in a data center based on a host media access control (MAC) address, comprising:
    determining, if a MAC address associated with the host is stored in memory;
    executing a first process, using a processing circuit, if the MAC address is stored in memory; and
    executing a second process, using a processing circuit, if the MAC address is not stored in memory;
    wherein the first process comprises:
        directing, at a network control module (NCM), an electrical packet switch operatively connected to an optical port of the OCS, to transmit a data packet containing the MAC address from an electrical packet switch;
        receiving, at the NCM, a response from the host, that the MAC address contained in the transmitted data packet corresponds to the MAC address of a network interface card (NIC) at the host;
        wherein the response comprises a determination of whether the host connected to the optical port determined by the NCM has been powered up;
    wherein the second process comprises:
        directing, at the NCM, an electrical packet switch operatively connected to an optical port of the OCS, to transmit to the host operatively connected to the OCS, a data packet; and
        receiving, at the NCM, a response from the host including a data packet in response to the host initiating a wake up procedure, wherein the data packet includes the MAC address of the host and the OCS port the host is connected to, from the electrical packet switch;
    wherein the OCS is a non-blocking OCS such that the NCM may direct any optical port on the optical circuit switch to connect with any other optical port on the OCS via an optical link.

19. A system for verifying connectivity between hosts and optical ports on an optical circuit switch in a data center based on a host MAC address, comprising:
    optical ports on the optical circuit switch (OCS) operably connected to a plurality of hosts having a network interface card (NIC);
    optical ports on the OCS system operably connected to a plurality of electrical packet switches;
    a network control module (NCM) comprising:
        a memory; and
        at least one processor configured to execute network control software stored in the at least one memory to:
            determine an optical linking topology for the optical circuit switch (OCS) wherein the optical linking topology comprises connections between OCS ports connected to the plurality of electrical packet switches and the plurality of hosts;
            instruct at least one of the plurality of electrical packet switches to transmit a wake on LAN (WOL) data packet containing a MAC address from the electrical packet switch to at least one of the plurality of hosts;

store, in memory at the NCM, a response from the at least one host wherein the response comprises an indication that the MAC address contained in the transmitted WOL data packet corresponds to the MAC address of the NIC at the at least one host; and compile and store a list of optical ports on the OCS that are associated with a non-functional optical link and generate display data including the list of optical ports associated with a non-functional optical link based on the stored determination, wherein the OCS is a non-blocking OCS such that the NCM may direct any optical port on the OCS to connect with any other optical port on the OCS.

20. The system of claim 19, wherein the MAC address and the OCS port for each host are stored in memory at the network control module prior to transmitting the WOL data packet.

21. The system of claim 19 wherein the plurality of hosts and the plurality of electrical packet switches are connected to OCS by an optical fiber link.

22. The system of claim 19, wherein the plurality of hosts are powered down prior transmitting the data packet from the at least one electrical packet switch, further wherein the plurality of hosts are powered down by at least one of manually powering down and broadcasting a power down instruction from the NCM.

* * * * *